July 25, 1933.  F. A. LEIGH  1,919,234
MIXING VALVE
Filed Dec. 17, 1930   2 Sheets-Sheet 1
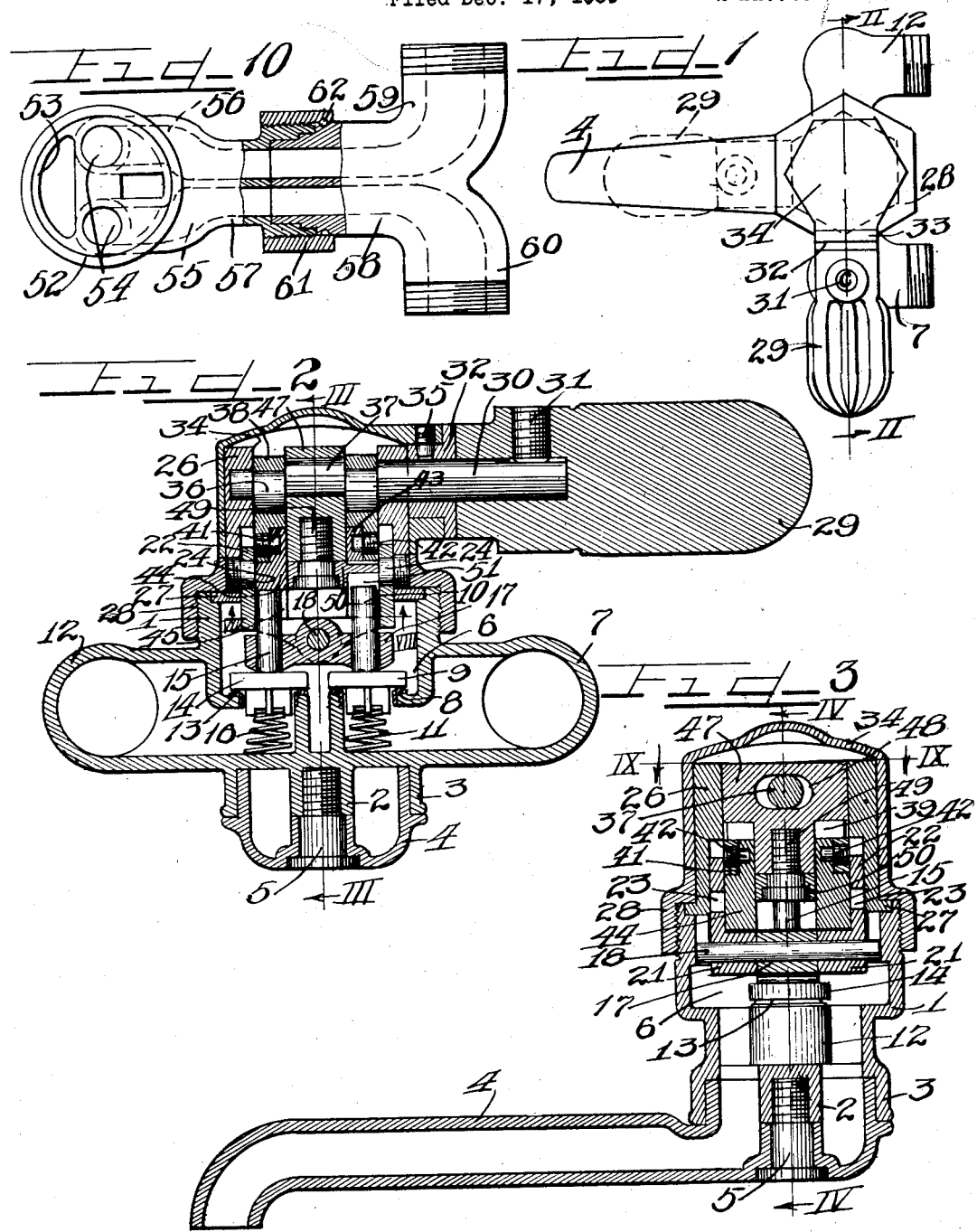

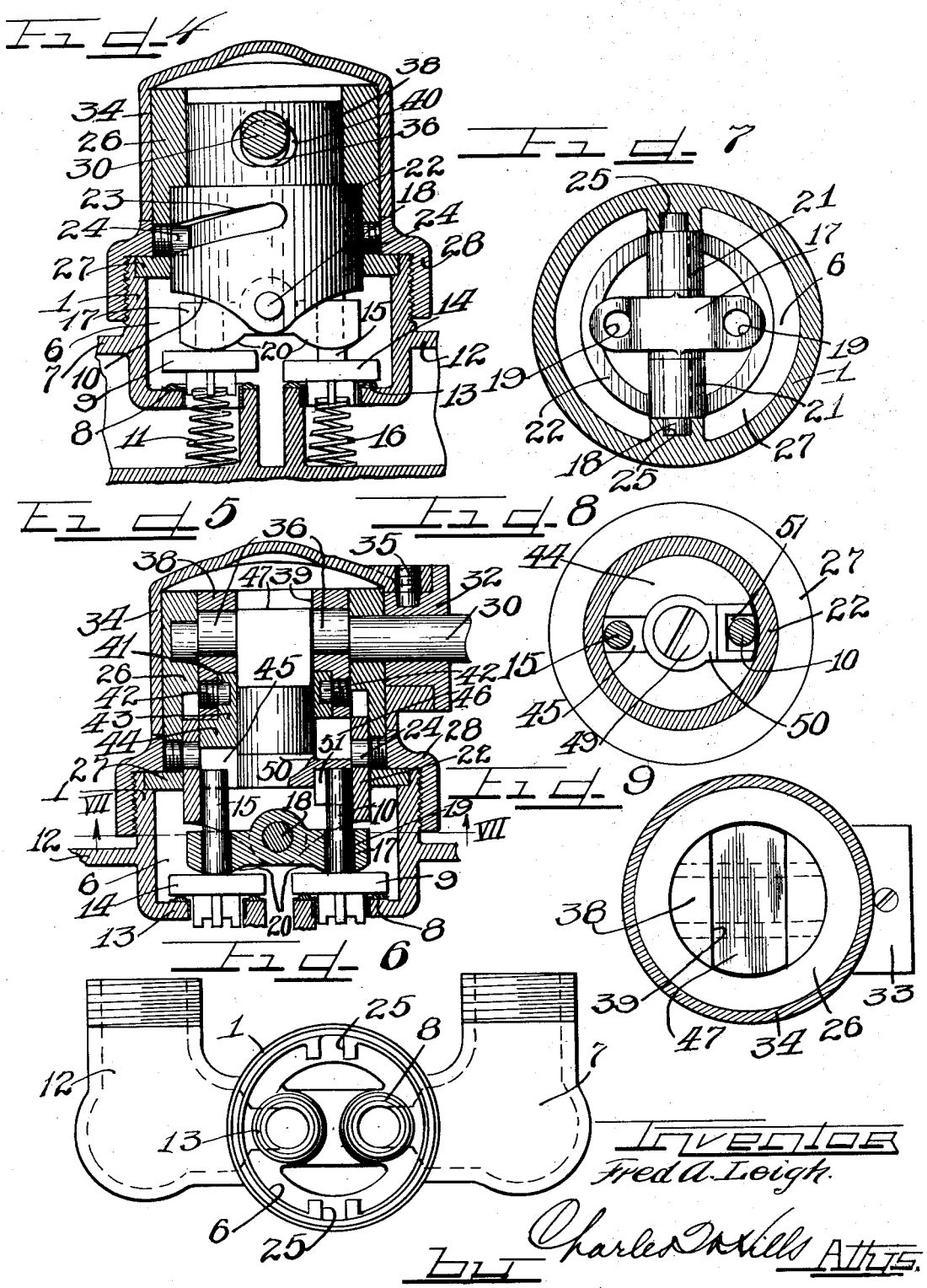

Patented July 25, 1933

1,919,234

UNITED STATES PATENT OFFICE

FRED A. LEIGH, OF CHICAGO, ILLINOIS

MIXING VALVE

Application filed December 17, 1930. Serial No. 502,915.

The present invention pertains to an improved type of a liquid mixing valve or faucet to facilitate the mixing of hot and cold liquids in desired proportions and for affording a novel arrangement whereby the temperature of the mixed liquid is adapted to be controlled by auxiliary control means operable by the axial rotation of a handle member to independently operate the cold and hot liquid control valves to govern the quantity of either the hot or cold liquid admitted into the mixing chamber of the faucet for discharge from a pivoted spout or nozzle forming a part of the mixing valve device.

It is an object of this invention to provide an improved type of mixing faucet wherein a single handle control is adapted to operate a main valve control mechanism and a composite eccentric member or shaft to selectively govern the independent operation of hot and cold liquid control valves by an axial rotation of the handle control to govern the flow of hot and cold liquids in predetermined quantities into a mixing chamber of the device to be discharged from the outlet nozzle or spout at desired temperatures.

It is also an object of this invention to provide an improved type of mixing valve device or faucet having a single control handle which is adapted to be revolved to actuate an eccentric shaft for governing the opening and closing of a plurality of valve members when the main control is released to thereby govern the quantity of hot and cold liquids discharged into a mixing chamber for the purpose of regulating the temperature of the mixed liquid to be discharged from an outlet spout.

Another object of the invention is to provide an improved type of mixing valve or faucet into which hot and cold liquids are adapted to be admitted through control valves which are governed by means of a single handle which, when pivotally operated, serves to actuate a main control for both of said valves and which, when axially rotated, causes operation of a plurality of eccentrics which are so arranged that the valves may be independently controlled to vary the quantity of either the hot or cold liquid admitted into the mixing chamber of the faucet to produce a mixture of a desired temperature.

It is an important object of this invention to provide an improved type of mixing valve faucet for governing the quantity and temperature of water discharged from the faucet spout by swinging a single handle control through an arc for first releasing a primary control governing a plurality of intake valves and then revolving the single handle control on its axis to actuate an eccentric shaft having a plurality of control eccentrics formed thereon whereby the intake valves are adapted to be adjusted with respect to one another for varying the quantity of hot and cold liquids admitted into a mixing chamber to produce a mixture of a predetermined or desired temperature for discharge through an outlet nozzle or spout forming a part of the faucet.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of an improved mixing valve device embodying the principles of this invention and showing the operation of the single handle control in dotted lines.

Figure 2 is an enlarged vertical detail section of the device taken on line II—II of Figure 1 with parts shown in elevation and with the primary control device so positioned that both of the intake valves are held in closed position.

Figure 3 is a vertical detail section of the device taken on line III—III of Figure 2.

Figure 4 is an enlarged fragmentary view taken on line IV—IV of Figure 3 with the interior mechanism illustrated in elevation when the single control handle has been moved from the full-line position of Figure 1 into the dotted-line position to release the primary or main control with the handle revolved on its axis to position the eccentric control shaft to permit opening of the cold water intake valve and complete closure of the hot water control valve.

Figure 5 is an enlarged fragmentary detail section similar to that illustrated in Figure 2, illustrating parts in elevation and showing the primary control in closed position to hold both of the intake valves closed and furthermore showing the eccentric shaft so positioned that the cold water secondary control is positioned to hold the cold water valve closed while the hot water auxiliary control is raised out of engagement with the stem of the hot water control valve.

Figure 6 is a top plan view of the main body of the faucet with the control mechanism and upper portion removed.

Figure 7 is a transverse detail section taken on line VII—VII of Figure 5 with parts shown in elevation and with parts omitted.

Figure 8 is a detail sectional view taken on line VIII—VIII of Figure 2.

Figure 9 is a detail horizontal section taken on line IX—IX of Figure 3.

Figure 10 is a fragmentary top plan view of a modified form of a main body section for the faucet and a T-coupling union connected therewith.

As shown on the drawings:

The reference numeral 1 indicates a casing or housing having integrally formed on the bottom thereof an internally threaded stud 2 and a guide sleeve or ring 3. Pivotally engaged in the guide or outlet sleeve of the casing is one end of a discharge nozzle or spout 4 which is pivotally supported in position by means of a screw bolt 5 or other suitable means. The inner end of the nozzle 4 communicates with a mixing chamber 6 provided within the casing 1.

Integrally forming a part of the housing 1 is a cold water intake elbow 7 which has one end thereof projecting outwardly to permit a cold water supply pipe to be connected therewith. The inner end of the cold water intake elbow 7 projects into the casing 1 and is formed to afford a valve seat 8 upon which a cold water control valve 9 normally seats to close off the supply of cold water. Attached to the top of the cold water control valve 9 is a cylindrical valve stem 10. Seated in the cold water intake elbow 7 is a control spring 11 of helical form with the upper end thereof engaged beneath the cold water intake control valve 9 to assist in holding said valve in open position when released, to permit the cold water to flow through the intake elbow 7 and into the mixing chamber 6 of the casing 1.

Also integrally connected with the casing 1 is a hot water intake elbow 12, the outer end of which is arranged to be connected with a hot water supply pipe. The inner end of the hot water intake elbow 12 is provided with a valve seat 13 against which a hot water control valve 14 is adapted to normally seat to close off the supply of hot water to the mixing chamber 6. Connected to the hot water control valve 14 is a valve stem 15. Mounted within the hot water intake elbow 12 is a coil controlled spring 16, the upper end of which engages beneath the hot water valve 14 to assist the same in moving into open position when the hot water control valve is released.

When the control valves 9 and 14 are released, as hereinafter more fully described, the force of the water entering the valve housing or casing 1 through the intake elbows 7 and 12 acts to move the valves 9 and 14 into open position. The control springs 11 and 16, however, are provided as an additional means for insuring positive opening of the valves when the same are released.

A primary or main control mechanism is provided in the mixing chamber 6 for controlling both the intake valves 9 and 14. In the present showing, the primary or main control consists of a bridge-bar or rocker member 17 which is pivotally mounted intermediate its ends on a pivot pin 18. The main control bar 17 is provided with passages 19 through which the valve stems 10 and 15 slidably project. The under-surface of the main control bar 17 is provided with convex rocker surfaces 20 for coaction with the top surfaces of the respective cold and hot water control valves 9 and 14 to normally hold said valves in closed position when the main control bar 17 is in its lowermost position as illustrated in Figure 2 of the drawings.

The rocker bar supporting pin 18 projects through bearing sleeves 21 which are integrally formed in axial alignment on the bottom of opposite sides of a main control cam cylinder or sleeve 22. The main control cam cylinder or sleeve 22 is provided with cam slots 23 on opposite sides thereof into which control pins or studs 24 project.

As clearly illustrated in Figure 7, the ends of the pin 18 project into vertical guide grooves 25 which are provided on diametrically-opposite sides of the main casing 1 to provide an arrangement whereby the cam sleeve 22 is held against rotation and is guided in its vertical sliding movement to cause raising or lowering of the main control bar or rocker 17 when the pins 24 are moved through the cam slots 23 as hereinafter more fully described. For the purpose of actuating the main control cam cylinder or sleeve 22 by means of the cam pins 24 said pins 24 are supported diametrically opposite one another in aligned position in a cylindrical sleeve or collar 26 which is rotatably supported upon the upper grooved end of the casing 1 by means of a flange 27. The control sleeve or collar 26 is rotatably supported upon the upper end of the casing 1 and is retained in position by means of a retaining or lock ring 28 which is internally threaded and is removably engaged on the externally threaded upper portion of the casing 1 as clearly illustrated in Figure 2. The retaining member 28, as illustrated in Figure 1, may be in the form of a retaining nut ring to facilitate mounting and removal thereof with respect to the casing 1.

For the purpose of independently controlling the control valves 9 and 14 when the main control or rocker bar 17 is in a released or raised position, a control handle 29 is provided. The handle 29 is removably secured on the outer projecting end of an eccentric shaft 30 by means of a set screw 31. The inner end of the control handle 29 is positioned adjacent the flanged outer end of a bushing or sleeve 32 which projects into an arm 33 which is integrally formed on one side of a hood or cap 34. The hood or cover 34 is engaged to seat over the upper projecting end of the sleeve 26 and rotatably seats upon the upper end of the retaining nut ring or collar 28. The bushing 32 is removably secured in position in the arm 33 by means of a set screw 35 as illustrated in Figure 2.

As clearly illustrated in Figure 2, the eccentric shaft 30 is rotatably journalled in suitable bearing recesses or openings provided in the sleeve or collar 26 so that when the handle 29 is rotated or swung through an arc from the full-line position illustrated in Figure 1 into the dotted-line position the sleeve 26 together with the cover or cap 34 are rotated upon the retaining ring 28 so that the control pins 24 mounted in the sleeve 26 are adapted to travel in the cam slots 23, thereby causing the cam cylinder or sleeve 22 to slide upwardly from the position illustrated in Figure 2 into the position illustrated in Figure 4, thereby causing the pin 18 to lift or raise the rocker control bar 17 so that the pressure of the cold and hot water in the elbows 7 and 12 together with the action of the control springs 11 and 16 will cause the cold and hot water control valves 9 and 14 to be moved into open position.

For the purpose of independently actuating the hot and cold water control valves 9 and 14, the eccentric shaft 30 is formed with a pair of hot water control eccentrics 36 positioned on opposite sides of a cold water eccentric 37. Slidably mounted within the sleeve or collar 26 is a hot water control sleeve 38 the upper end of which is provided with a diametrical slot or opening 39 forming two upper side members each of which is provided with an elongated opening or slot 40 for the reception of one of the eccentrics 36. The lower end of the hot water control sleeve 38 is provided with a recess 41 into which a pair of diametrically opposite pins 42 project. The pins 42 project into a peripheral groove formed in a collar 43 which is integrally formed on the upper end of a hot water control ring 44 having a radial notch 45 formed on one side thereof into which the upper end of the hot water valve stem 15 projects, as clearly illustrated in Figure 4. Also formed in the hot water control ring 44 opposite the notch or slot 45 is a groove or notch 46. When the hot water control valve 14 is in released position as illustrated in Figure 4, it is adapted to be independently adjusted by means of the handle 29 which may be axially rotated or revolved to cause the eccentrics 36 to move the sleeve 38 and the hot water control valve ring 44 from the position illustrated in Figure 5 toward the position illustrated in Figure 2 so that the ring 44 coming in contact with the upper end of the hot water control valve stem 15 causes the hot water control valve 14 to be adjusted to regulate the amount of hot water admitted from the hot water intake elbow 12 into the mixing chamber 6 of the casing 1.

For the purpose of independently adjusting the cold water control valve 9 when the main control bar 17 is in an elevated position, a T-head 47 is slidably mounted in the sleeve 26 and in the hot water control valve ring 44. The T-head 47 is provided with an elongated opening or slot 48 (Figure 3) in which the cold water control eccentric 37 is positioned. The stem or shank of the T-head 47 projects axially through the ring 44 and has pivotally supported on the lower end thereof by means of a screw member 49 a cold water valve control arm 50 which projects into the slot 46 and is provided with a notch or recess 51 as shown in Figure 8 into which the upper end of the cold water control valve stem 10 projects. When the main valve control bar 17 is raised to release the valves 9 and 14, the cold water control valve 9 may be independently adjusted by axially revolving or rotating the handle 29 to cause the cold water control eccentric 37 to operate the T-head 47 to cause the cold water control arm 50 to coact with the upper end of the cold water valve stem 10 to adjust the cold water inlet valve 9 to control the quantity or flow of cold water from the cold water intake elbow 7 into the mixing chamber 6 of the casing 1.

Figure 10 illustrates a modified form of valve casing or housing 52 provided with a mixing chamber 53 into which the hot and cold water is adapted to be admitted through valve seat openings 54 which communicate with the cold water intake passage 55 and a hot water intake passage 56 which are formed in a single intake arm 57 the end of which is shaped to interfit with the outlet arm 58 of a T-coupling or union having integrally formed thereon a hot water intake arm or elbow 59 and a cold water arm or elbow 60. The double passaged casing arm 57 connects up with the double passage coupling arm 58 and is connected thereto by means of a coupling ring or collar 61 and a lock pin 62. In the form of coupling arrangement for the faucet illustrated in Figure 10, the hot and cold water supply elbow or coupling 58—60 may be mounted in a wall with the arm 58 projecting outwardly to permit the casing faucet to be engaged thereon.

The operation of the improved mixing valve device is adapted to be conveniently accomplished by means of the single handle 29 which is adapted to be operated with a composite movement for the purpose of not only controlling the quantity of water discharged from the outlet nozzle, but for regulating the temperature of the discharged water.

The volume of the water discharged from the nozzle or spout 4 is adapted to be controlled when the control handle 29 is pivoted or swung through an arc from the full line position illustrated in Figure 1 toward the dotted line position. By pivotally swinging the control handle 29 the hood or cap 34 is rotated with respect to the casing 1, thereby causing the various control mechanisms within the cover or cap 34 to be rotated therewith. When the handle 29 is swung through an arc, it will thus be noted that the cam controlled sleeve 26 is rotated with respect to the casing 1 thereby causing the pins 24 to move from the upper end of the cam slots 23 toward the lower ends of said slots into the position illustrated in Figure 4, thereby causing the main control cylinder or sleeve 22 to slide upwardly from the position illustrated in Figure 5 into the position illustrated in Figure 4, thereby raising the main control bar or rocker member 17 to simultaneously release both the cold water control valve 9 and hot water control valve 14. With the upward movement of the control bar 17 as described, the pressure of the cold water in the intake elbow 7 and the pressure of the hot water in the hot water intake elbow 12 acting against the respective valves 9 and 14 together with the action of the control springs 11 and 16 causes the control valves to be moved into open position to admit predetermined quantities of cold and hot water into the mixing chamber 6 of the device. It will thus be noted that by pivotally swinging the handle 29 through an arc that the control valves are adapted to be opened a predetermined amount depending upon the movement of the handle so that a predetermined quantity of water is discharged from the outlet spout or nozzle 4.

For the purpose of regulating the temperature of the quantity of water discharged from the nozzle 4, the cold water control valve 9 and the hot water control valve 14 are adapted to be independently adjusted in their released positions by means of a common eccentric control in the form of the eccentric shaft 30 which carries the control eccentrics 36 and 37. After the handle has been swung through an arc to determine the quantity of water discharged from the nozzle 4, the temperature of the water discharged may be regulated by axially rotating or revolving the handle 29 on its axis to cause rotation of the eccentric shaft 30 and the eccentrics forming a part thereof. When the eccentric shaft 30 is rotated so that the eccentrics 36 are in their lowermost position as illustrated in Figures 2 and 4, the control sleeve 38 together with the control ring 44 are moved downwardly within the sleeve 26 causing the control ring 44 to engage against the upper end of the hot water control valve stem 15 to move the hot water control valve 14 into closed position as illustrated in Figure 4. When the control eccentrics 36 which govern the hot water control valve 14 are in their lowermost position, as illustrated in Figure 2, the control eccentric 37 governing the operation of the cold water control valve 9 is in its uppermost position thereby holding the T-head 47 in its elevated position together with the control arm 50 thereby permitting the pressure of the cold water from the intake elbow 7 together with the cold water valve control spring 11 to move the cold water valve 9 into open position as illustrated in Figure 4 to permit a supply of cold water to be admitted into the chamber 6 when the hot water valve 14 is completely closed so that a constant quantity of cold water is discharged from the nozzle 4.

In a similar manner, the handle may be axially rotated to position the control eccentrics 36 in their uppermost position as illustrated in Figure 5 thereby positioning the control eccentric 37 in its lowermost position whereby the water control valve 9 is moved into closed position by means of the control arm 50 while the hot water control valve 14 is released by the upper movement of the control ring 44 thereby permitting the pressure of the hot water from the supply elbow 12 together with the control spring 16 to cause the hot water valve 14 to be moved into open position to permit only a supply of hot water to be admitted into the casing chamber 6 for discharge from the nozzle 4.

By rotating the handle 29 to position the control eccentrics 36 and 37 into intermediate position, the cold and hot water control valves 9 and 14 are adapted to be simultaneously adjusted in opposite directions for independently controlling the admittance of cold water and hot water into the mixing chamber 6 of the casing 1 without causing any variations in the volume of the water which is discharged from the nozzle 4 which volume is controlled by the adjustment of the handle 29 when the same is swung through an arc. It will thus be noted that by swinging the handle 29 through an arc of a circle that the quantity of water is first controlled due to the raising of the common control bar 17 a predetermined amount depending upon the adjustment of the handle after which the handle is axially rotated to rotate the eccentric shaft 30 and the control eccentrics 36 and 37 forming a part thereof whereby the cold and hot water control valves 9 and 14 are independently adjusted in opposite directions to govern the amount of cold and hot water admitted into the mixing chamber 6 without any change in the volume adapted to be discharged from the outlet nozzle 4.

The improved mixing valve device affords an arrangement whereby the quantity and the temperature of water discharged from the outlet nozzle is adapted to be controlled by means of a single handle which is adapted to be swung through an arc or pivotally adjusted to release the main control bar or rocker member 17 which governs both the cold and hot water supply valves 9 and 14 respectively. The amount of swing of the control handle 29 determines the degree of opening of both of the cold and hot water valves and determines the volume of water admitted into the mixing chamber 6 for discharge from the spout or nozzle 4 of the device. After the handle 29 has been pivotally swung to determine the quantity of water to be discharged from the faucet, the same handle 29 is adapted to be axially rotated or revolved to cause the control eccentrics 36 and 37 to simultaneously actuate the control sleeve 38 and the T-head 47 in opposite directions to cause the control ring 44 and the control arm 50 to be adjusted with respect to the valve stems 15 and 10, respectively, to cause a selective operation of the valves 14 and 9 to vary the amount of hot and cold water admitted into the mixing chamber 6 without variation of the quantity of water being discharged from the nozzle 4. It will thus be noted that the quantity of water discharged from the faucet is controlled by pivotally swinging the control handle 29 while the temperature of the water discharge is adapted to be controlled by axially revolving or rotating the handle 29 in a set position of adjustment. When the eccentric shaft 30 is so positioned that the eccentrics 36 and 37 are both positioned in their intermediate positions equal quantities of cold and hot water are admitted into the mixing chamber 6 for discharge from the nozzle 4. To shut off the discharge of water at a predetermined temperature from the nozzle 4, it is only necessary to swing the control handle 29 from a position of adjustment back into the full line position illustrated in Figure 1 thereby causing the control sleeve 22 to move the control bar 17 from the open position illustrated in Figure 4 back into the closed position illustrated in Figure 5 in which the rocker surfaces 20 engaging the upper surfaces of the valves 9 and 14 move said valves into their closed position.

It will, of course, be understood that various details of construction may be varied through a wide range without departing from the principles of this invention, and it is, therefore, not the purpose to limit the patent granted hereon otherwise than is necessitated by the scope of the appended claims.

I claim as my invention:

1. A mixing valve device comprising a casing, a plurality of valves therein, a plurality of telescoping control means in said casing, an eccentric shaft for simultaneously actuating said control means to independently operate said valves, and a single control for operating the eccentric shaft.

2. A mixing valve device comprising a casing, a plurality of valves therein, a single control means for simultaneously releasing and closing said valves, and eccentric means operable by said single control means for independently adjusting said valves.

3. A mixing valve device comprising a casing, a plurality of valves therein, telescoping members for independently adjusting said valves, eccentrics for slidably operating said telescoping members, and a control for rotating said eccentrics and further adapted to rotate said telescoping members.

4. A mixing valve device comprising a casing, a plurality of valves therein, a plurality of control means mounted in said casing for simultaneously and independently actuating said valves, and a single control operable with a composite movement for selectively operating said control means, including telescoping members simultaneously oscillatable at right angles to said valves and slidably movable with respect to one another toward and away from the valves.

5. A mixing valve device comprising a casing having a mixing chamber therein, liquid intake valves in said casing, and control means for simultaneously and independently operating said valves and including slidably interfitting members simultaneously oscillatable at right angles to said valves and alternately movable toward and away from the same.

6. A mixing valve device comprising a casing having a mixing chamber therein, liquid intake valves in said casing, a common control for both of said valves, a slidable member in said casing for operating said common control, said member having cam slots therein, rotatable means in said casing co-acting with said cam slots for actuating said member, and handle means for operating the rotatable means.

7. A mixing valve device comprising a casing having a mixing chamber therein, liquid intake valves in said casing, a common control for governing the operation of said valves, a slidable member in said casing for actuating said common control, rotatable means for operating said slidable member, a control handle for operating the rotatable means, and a plurality of shiftable means in said casing operable by the control handle for independently adjusting said valves.

8. A mixing valve device comprising a casing having a mixing chamber therein, a plurality of intake valves in said casing, a common control for governing the operation of both of said intake valves, a plurality of telescoping mechanisms in said casing and a common control for operating said telescoping mechanisms to selectively operate said valves.

9. A mixing valve device comprising a casing having a mixing chamber therein, a plurality of intake valves in said casing, a common control for said valves, a slidable means for operating said common control, slidable interfitting mechanisms for independently adjusting said valves and a common control adapted to be selectively operated to actuate said slidable means and selectively operate said interfitting mechanisms to produce a selective operation and adjustment of said valves to vary the volume and the temperature of liquid discharged from the mixing valve device.

10. A mixing valve device comprising a casing, a cold water control valve and a hot water control valve in said casing, a common control for simultaneously governing the operation of said valves, reciprocating means for operating said common control, a rotatable member for actuating said reciprocating means, a handle connected therewith and adapted to be swung through an arc to cause simultaneous release of said valves to permit predetermined quantities of cold and hot water to be admitted into the casing, reciprocating mechanisms in said casing for independently controlling the operation of said valves, and means operable by the handle control to cause a selective operation of said reciprocating mechanisms to independently adjust said valves to govern the temperature of the mixture within the casing.

11. A mixing valve device comprising a casing having a mixing chamber therein, an outlet spout connected with said casing, a cold water control valve in said casing, a hot water control valve in said casing, slidable interfitting mechanisms for independently adjusting said valves, rotatable means for simultaneously actuating said mechanisms to independently control the operation of said valves, a handle for operating said rotatable means, and means also operable by said handle for simultaneously closing and releasing said valves.

12. A mixing valve device comprising a casing having a mixing chamber therein, cold and hot water control valves in said casing, a common control for both of said valves, a hot water control valve mechanism, a cold water control valve mechanism, and a single control means adapted to be actuated selectively to cause operation of said common control to simultaneously release both of said valves and then be selectively operated to actuate said cold water control mechanism and said hot water control mechanism in opposite directions to independently adjust the valves to regulate the temperature of the mixture in said mixing chamber and maintaining a constant volume discharge from the mixing valve device.

13. A mixing valve device comprising a casing, a cold water valve and a hot water valve mounted therein, a common control for both of said valves, a cold water control, a hot water control, a single control means for operating said common control to cause simultaneous operation of said valves, and a member operable by said single control means for selectively operating the hot water control and the cold water control to independently adjust said valves to vary the temperature of the liquid mixture in said casing after the single control means has been set for the discharge of a predetermined volume of the liquid from the mixing valve device.

14. A mixing valve device comprising a casing having a mixing chamber therein, hot and cold water control valves in said casing, a sleeve slidably mounted in said casing and having cam slots therein, a common control member pivotally supported on said sleeve governing the operation of said valves, a rotatable member engaged around said sleeve, pins supported by said rotatable member and projecting into the cam slots of said sleeve and means for rotating said rotatable member to cause said pins to slidably adjust said sleeve and the common control member carried thereby to simultaneously release or close said valves.

15. A mixing valve device comprising a casing having a mixing chamber therein, cold and hot water control valves in said mixing chamber, a control sleeve slidably mounted in said casing and having cam slots therein, a common control supported by said sleeve for governing the operation of said valves, a rotatable member in said casing, pins carried thereby and projecting into the cam slots of said slidable sleeve, a plurality of control devices slidably mounted in said rotatable member, and a single control means selectively operable for adjusting said rotatable member and said slidable control devices to first simultaneously release said valves to control the volume of liquid discharged from the mixing valve device and then selectively adjust said valves to regulate the temperature of the liquid while maintaining a constant volume discharge.

16. A mixing valve device comprising a casing having a mixing chamber therein, hot and cold water control valves in said mixing chamber, a common control device for said valves, a hot water control device, a cold water control device, and means selectively operable to actuate the common control device to release said valves simultaneously and to selectively adjust the hot water control device and the cold water control device to independently adjust said valves to govern the temperature of the mixture.

17. A mixing valve device comprising a casing, a plurality of liquid intake control valves therein, a plurality of slidably interfitting control devices in said casing for governing the operation of said valves, and a single control selectively operable for selectively actuating the slidable control devices to release said valves simultaneously and to regulate the quantity of the liquid discharged from the mixing valve device and then to cause a selective adjustment of the valves to regulate the temperature maintaining a constant volume discharge.

18. A mixing valve device comprising a casing, a plurality of control valves therein, a plurality of relatively slidable control members in said casing for governing the operation of said valves, and a single control for selectively operating said relatively slidable control devices to simultaneously release the valves and then selectively adjust the same in compensating relation with respect to one another to regulate the temperature for a constant volume discharge.

19. A mixing valve device comprising a casing, a plurality of control valves therein, a plurality of telescoping control mechanisms for said valves in said casing, a single eccentric shaft for selectively governing the operation of said telescoping control devices, and a handle control operable with a composite movement for actuating the eccentric shaft to selectively adjust the valves to govern the volume and temperature of the liquid discharged from the mixing valve device.

20. A mixing valve device comprising a casing, a plurality of control valves mounted therein, a common control for said valves, an individual control for each of said valves, a plurality of supports for said common control and said individual controls, and a single means selectively operable to simultaneously rotate said supports and cause relative slidable adjustment thereof to selectively operate said common control and said individual controls to release the valves and then independently adjust the same for variations in temperature of a liquid mixture at a constant volume discharge.

FRED A. LEIGH.